United States Patent [19]

Dahlberg et al.

[11] 3,984,812
[45] Oct. 5, 1976

[54] COMPUTER MEMORY READ DELAY

[75] Inventors: Clayton Paul Dahlberg, Hermosa Beach; Donald Allen Peterson, Goleta, both of Calif.

[73] Assignee: Burroughs Corporation, Detroit, Mich.

[22] Filed: Apr. 15, 1974

[21] Appl. No.: 460,823

[52] U.S. Cl. ............................................ 340/172.5
[51] Int. Cl.² ........................................... G06F 9/20
[58] Field of Search .......... 340/172.5; 235/153 AE, 235/153 BK

[56] References Cited
UNITED STATES PATENTS

| | | | |
|---|---|---|---|
| 3,444,528 | 5/1969 | Lovell et al. | 235/153 AE |
| 3,624,372 | 11/1971 | Philip et al. | 235/153 AE |
| 3,633,179 | 1/1972 | Reynolds | 340/172.5 |
| 3,651,475 | 3/1972 | Dunbar, Jr. et al. | 340/172.5 |
| 3,660,646 | 5/1972 | Minero et al. | 235/153 BK |
| 3,681,758 | 8/1972 | Oster et al. | 340/172.5 |
| 3,699,533 | 10/1972 | Hunter | 340/172.5 |
| 3,725,870 | 4/1973 | Felcheck et al. | 340/172.5 |
| 3,763,474 | 10/1973 | Freeman et al. | 340/172.5 |
| 3,810,119 | 5/1974 | Zieve et al. | 235/153 AE |

*Primary Examiner*—Eugene G. Botz
*Assistant Examiner*—Errol A. Krass
*Attorney, Agent, or Firm*—Arthur Decker; Nathan Cass; Kevin R. Peterson

[57] ABSTRACT

Disclosed is a digital computer memory system which coordinates between plural memories such that information recall from memories having different inherent access times results in a flow of only relevant data to the processor; this is accomplished in, for instance, a dual memory system, by synchronizing the operation of the memories such that the normal clock pulse of the computer strobes the output register of the faster (i.e., "normal") memory but a delayed clock pulse strobes the output register of the slower memory. Thus, because of the delayed strobe, the latter, as well as the former, has time to complete an access requested by the processor, and, consequently, transfer to the processor of incorrect or meaningless information is avoided. This system is incorporated in the computer in the form of additional registers, memory elements, gates and arithmetic circuits, which recognize addresses as falling within either memory, energize the appropriate memory and excite it for read out with either a normal or delayed strobe as determined by its identification as the fast or slow memory, respectively.

3 Claims, 1 Drawing Figure

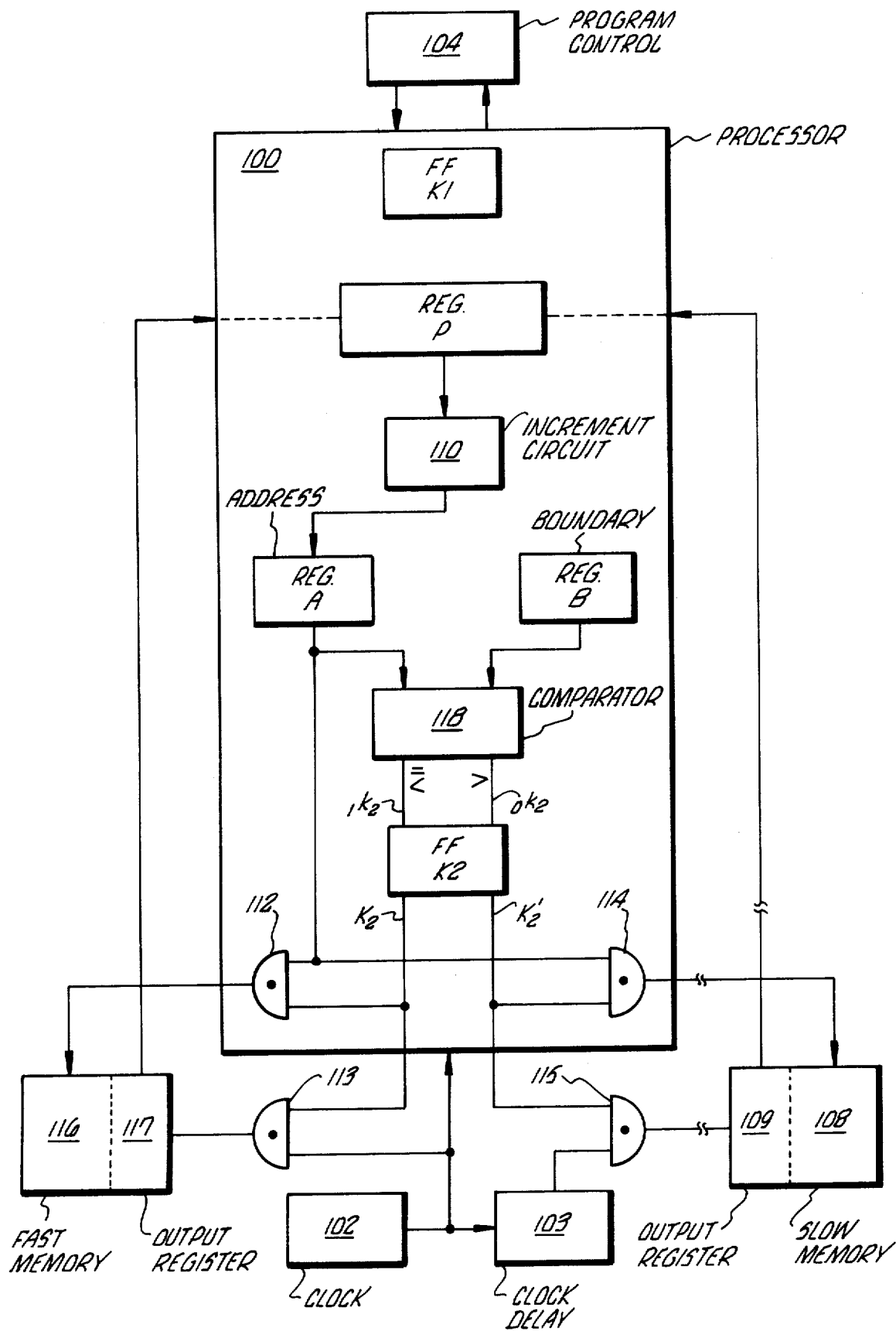

COMPUTER MEMORY READ DELAY

BACKGROUND OF THE INVENTION

Computer technology has advanced to a current stage characterized by systems in which each of their building blocks (e.g., the memory, the processor and interfaces to peripherals) are not only represented by a variety of different types, but also in the plurality and with a wide selection of admixtures. Thus, in the same system, one or more processors may coordinate through interfaces with a number of memories, quick to respond to processor requests for data, usually because of incorporation in a common mainframe, and some relatively slow to respond, perhaps because of the necessity to locate remotely; for the latter, connection to the processor unit by lengths of cable introduces a delay inherent in such cabling.

Thus, for the sake of simplicity, consider a system in which a processor, which includes a fast-access integral memory, is operatively connected also (through an interface and cabling) with a slow-access memory. Presume that a memory access transaction involves two phases: a request phase followed by a response phase. During the former, the processor issues an access request signal, an address comprising both a memory unit designation and a bit or word address identifying a location within the selected memory and command signals representing the type of operation desired. During the subsequent response phase, the selected memory unit returns a status (i.e., "busy"or"not busy") signal and signals representing the information content of the addressed location; during this phase, a memory unit remains busy until the information content of the addressed location arrives at the processor. The transition from busy to not busy indicates that the sought information is at the processor input and ready for its use. Such a memory access operation is quite conventional in computer systems, and although its details vary among systems, a generally common characteristic is that transmissions are controlled by the clock pulse signal ("strobe") of the processor.

Assume further that, regardless of which memory is addressed, it is immediately available to service the request, and accordingly, sets up its output register with the sought information. If the processor is arranged to strobe the registers with its clock pulse next following its access request signal, a standard made possible in view of the high speed of the fast memory, the delay because of remoteness of the slow memory will preclude presentation of information to the processor in synchronism with its requests. It is apparent that some provision must be made in strobe sequentially-needed data residing in memories characterized by different access times such that the input stream appears to the processor as though there were but one memory or as though both memories operated identically with regard to access of their content.

Brief Summary of the Invention

As already intimated, the present invention accomplishes this objective by incorporating circuitry in the computer system which generates, not only the memory register strobing pulse, but also a delayed version thereof, and which selects between the two for strobing, depending on the memory to be read.

BRIEF DESCRIPTION OF THE DRAWING

The FIGURE is a block diagram of a computer system which may embody the present invention.

DESCRIPTION OF THE PREFERRED EMBODIMENT

Before embarking on a detailed description of the preferred embodiment of the invention shown in the drawings, it may be appropriate to provide some brief comments on the general purpose computer and how it is used.

A general purpose computer carries out a function by performing numerical mathematical operations according to a series of commands (the program) which, during their execution, the computer may modify either in a preset manner or according to the outcome of tests on intermediate results of computation. Its operations are consequently definable as arithmetic, input-output and sequencing and its equipment correspondingly comprises units which contribute logic, peripheral interface and control.

Referring now to the FIGURE, here is shown a very generic block diagram of a preferred form of computer system for embodying the present invention. This system is of the general purpose type capable of storing numbers as combinations of bilevel states in sets of memory elements (i.e., flip-flops), and involves the sequential operation of circuits, including pulse sources, gates, etc., to trigger the memory elements in accordance with Boolean equations which represent the computer activity leading to the accomplishment of the desired objectives.

Processor 100 is comprised mainly of networks which function to interconnect the registers, counters, input-output equipment, etc., of the system so as to route information in accordance with the commands selected by the program from the set which the computer is capable of executing. Some of this equipment traditionally is considered part of processor 100 whereas some is considered external thereto. Accordingly, processor 100 is shown connected by lines to some units while embodying others, although it should be understood that a showing of connection or embodiment is a choice directed mainly toward teaching the invention and not actual structural configuration.

Although the inventive concept is quite applicable to other systems of representing information in a computer, it will be presented herein with regard to a synchronized pulse system. By this is meant a system in which repetitive pulses, whether information-representing or "clock" signals, or otherwise, are synchronized to occur at particular time intervals with reference to each other. In such a system, signals may be of square waveshape alternating between specific voltage levels, as, for instance, +10 volts and zero volts (ground potential) present on a line; and it is most convenient to regard synchronization as being provided by clock signals of symmetrical square waveshape generated by a pulse generator, which may comprise a repetitive magnetic recording associated with a sensing electromagnetic transducer and pulse shaping circuitry, or a frequency-controlled square wave generator, or other appropriate means. Synchronization by such means implies that the potential of a line may change between the levels of +10 volts and zero volts only at the time of the trailing edge of the clock signal pulse, the time between trailing edges being designated as a bit period.

Accordingly, the bit periods are established by clock 02 which emits a symmetrical square wave signal on nes to delay 103, gates 113, 115 (via delay 103), rocessor 100 and, through the latter, to memories 08, 116 and program control 104. The signal, of ourse, is characterized by a repetition rate commensurate with the speed capability of the circuitry.

The organization of the computer corresponds to the rogramming technique which involves, in essence, the cheduling of the presentation of information to processor 100 on a time division basis for which the unit is he bit period. An operation is performed by executing he presentation in a predetermined sequence, said equence including the repetition of steps or a subsequence of steps if required; this is the function of program control 104.

Program control 104 usually takes the form of a counter the outputs of which are accepted by processor 00 to render certain networks active during each bit period so as to accommodate each of the steps. The content of program control 104 is subject to being changed precisely at the end of each bit period, as directed by the state of flip-flop K1 during the preceding bit period, to cause the same or other netorks to become operable during the next bit period. Further, since flip-flop K1 is connected to be triggered in accordance with the manipulation in progress during the bit period (i.e., flip-flop K1 "follows" the operation), it is apparent that the results of the operation underway provide the foundation for operations to be undertaken. Thus, the computer sequences in orderly fashion to accomplish its program.

The invention will be described with regard to a memory read operation in which a stream of bits are accessed in sequence from a pair of memories: fast memory 116, located locally to processor 100 as shown by solid connecting lines, is presumed to store the leading (first accessed) set of bits whereas slow memory 108, located remotely to processor 100 as shown by interrupted connecting lines, is presumed to store the trailing set of bits. The read-out from memories 108, 116 is entered into register P. The addresses for storage in memories 108, 116 will be presumed sequential starting at an initial address set up by the operator in memory address register A through the system control console (not shown).

For every entry of an accessed bit and the status signal into register P from either of memories 108, 116, processor 100 causes translation of the latter from busy to not busy, and this register generates excitation for increment circuit 110 which, in turn, provides a unit addition to the address (corresponding to the priorly accessed bit) stored in register A, and also enables program control 104 to proceed with the handling of the received data.

Also set up by the operator, in register B, is a boundary address comprising a demarcation between addresses in the two memories: addresses equal to or less than the boundary value are found in memory 116, whereas those greater than this value are found in memory 108. Accordingly, for each access, comparator 118 receives the outputs of registers A and B, makes the comparison and excites true input $_1k_2$ of flip-flop K2 if the register A address is equal to or less than the register B boundary but excites false input $_0k_2$ of flip-flop K2 if otherwise.

True output $K_2$ of flip-flop K2 provides one input to each of AND (coincidence) gates 112, 113 whereas false output $K_2'$ of flip-flop K2 provides one input to each of AND gates 114, 115. The other input to gates 112, 114 comprises the output of register A (the address to be accessed); accordingly, if the sought address is equal to or less than the boundary address, flip-flop K2 will be triggered true by comparator 118 and gate 112 will cause a fast memory 116 look-up, but if the sought address is greater than the boundary address, flip-flop K2 will be triggered false by comparator 118 and gate 114 will cause a slow memory 108 look-up. In either case, the respective output register 117, 109 will be set up with the accessed information.

Outputs $K_2$, $K_2'$ of flip-flop K2 also provide one input to gates 113, 115, respectively; the other input to gate 113 comprises clock 102 whereas the other input to gate 115 comprises the output of a circuit, clock delay 103, which provides a time delay for its clock pulse input commensurate with the difference in access times of memories 108, 116. Accordingly, for a memory 116 look-up, register 117 is strobed (i.e., read) with a normal clock pulse whereas, for a memory 108 look-up, register 109 is strobed with a delayed clock pulse; in either case, of course, the read-out and status signal are transferred to register P.

It is recognized that the FIGURE and this description provides a rather broad teaching of the present invention. It is submitted that this is justified in view of the supplementary information easily available to those skilled in the computer arts. One example is the discussion of memory element structure and operation contained in chapters 5 and 6 of the book "Logical Design of Digital Computers" by Montgomery Phister, Jr., Wiley, N.Y. 1958; this book may also be used to refer to memory techniques (chapter 7) and incrementation or counting (pages 248 et seq.). Also, it will readily be appreciated that this specification implies no structural limitation to those acquainted with computers or logic design; in brief, the present description should be considered exemplary for teaching those skilled in the computer arts and not constrained to the showing herein or in the aforementioned reference.

What is claimed is:

1. In a computer system:
    first and second stores;
    means to distinguish an access request as involving one or the other of said stores, said distinguishing means including an address register for storing the address of a present access, a boundary register for storing an address limit for said stores and a comparator responsive to said registers to provide outputs corresponding to appropriate store excitation; and
    an access system common to both said stores, said access system including timing means; delay means for said timing means; means to control said timing means and said delay means selectively in accordance with the store identified by said distinguishing means and gating circuits responsive to said timing, delay and control means to provide inputs to said stores, said gating circuits including a first pair of gates responsive to one output of said control means and to said timing means to provide inputs to one of said stores and a second pair of gates responsive to the other output of said control means and to said delay means to provide inputs to the other of said stores.

2. The system of claim 1 wherein said comparator provides a pair of outputs, one corresponding to address register content being at most equal to boundary register content and the other corresponding to address register content being greater than boundary register content.

3. The system of claim 1 wherein one gate of each of said pair of gates is also responsive to said address register.

* * * * *